United States Patent [19]

Wanner et al.

[11] 4,066,136

[45] Jan. 3, 1978

[54] TORQUE AND IMPULSE TRANSMITTING MACHINE

[75] Inventors: Karl Wanner, Echterdingen; Reinhard Hahner, Kemnat; Wolfgang Schmid, Plattenhardt; Gernot Hansel, Stuttgart-Plieningen; Manfred Bleicher, Leinfelden, all of Germany

[73] Assignee: Robert Bosch G.m.b.H., Stuttgart, Germany

[21] Appl. No.: 674,743

[22] Filed: Apr. 7, 1976

[30] Foreign Application Priority Data

Apr. 15, 1975 Germany ............................ 2516406

[51] Int. Cl.$^{2}$ ............................................ H02G 3/04

[52] U.S. Cl. ........................................ 173/48; 64/29; 173/116

[58] Field of Search .................. 173/48, 47, 116, 118, 173/12; 64/29

[56] References Cited

U.S. PATENT DOCUMENTS

| | | | |
|---|---|---|---|
| 3,456,740 | 7/1969 | Paule et al. | 173/118 |
| 3,507,337 | 4/1970 | Chromy | 173/48 |
| 3,752,278 | 8/1973 | States | 64/29 |
| 3,774,699 | 11/1973 | Schmuck | 173/48 |
| 3,828,865 | 8/1974 | Schnizler | 173/48 |
| 3,837,409 | 9/1974 | Consoli et al. | 173/48 |
| 3,889,491 | 6/1975 | Wanner et al. | 64/29 |
| 3,929,195 | 12/1975 | Stiltz et al. | 173/116 |
| 3,979,925 | 9/1976 | Kato | 64/29 |

*Primary Examiner*—Robert Hafer

*Attorney, Agent, or Firm*—Michael J. Striker

[57] ABSTRACT

A portable torque and impulse transmitting machine comprises an elongated housing having a median plane of symmetry which extends in direction of the elongation of the housing, and a tool holder which is mounted on the housing for holding a material-penetrating tool. A drive motor is mounted in the housing and has a rotary output shaft which is mounted in the housing so as to lie in and substantially bisect the median plane. An impeller assembly is also mounted in the housing and includes an impeller mounted for reciprocting movement therein and operative for transmitting impulses to the tool. A first power train is mounted in the housing and arranged to effect reciprocatory movement of the impeller in response to rotation of the rotary shaft of the drive motor. The first power train comprises a crank gear having an axis of rotation which is substantially parallel to the rotary shaft and which is also offset from the median plane. A second power train is mounted in the housing and arranged to transmit torque to the tool in the holder. The second power train includes an intermediate gear laterally adjacent the crank gear and in motion-transmitting engagement therewith. A safety overload clutch is mounted in series between the rotary shaft of the motor and the tool and is operative to terminate the transmission of torque from the rotary shaft to the tool when the latter encounters a resistance to rotation which exceeds a predetermined value.

32 Claims, 7 Drawing Figures

TORQUE AND IMPULSE TRANSMITTING MACHINE

BACKGROUND OF THE INVENTION

The present invention relates to a portable torque and impulse transmitting machine, such as a hammer drill, which can be used for the drilling of holes in rock, concrete or analogous materials. More particularly, the invention relates to improvements in portable torque and impulse transmitting machines of the type wherein the tool can receive axially oriented impulses to facilitate its penetration into a rock or the like while the tool rotates or while the transmission of torque from a prime mover to the tool is interrupted.

In presently known machines of the above-outlined type, the gear transmission for imparting torque to the tool is relatively complicated and occupies a great amount of space, thus making the gear transmission very expensive. In an attempt to utilize less space, each of the individual gears of the prior-art transmission systems is arranged in different planes. However, the many different orientations of the gears have the drawback that the machine is difficult to service. For example, in some machines, the gears are located within the handle portion of the housing. If one wishes to service these gears, one would have the additional problem of having to remove the top cover of the housing and the handle. Not the least of the disadvantages present in the prior-art machines is that they are too heavy to be easily managed because of their relatively large size.

SUMMARY OF THE INVENTION

Accordingly, it is the general object of the present invention to overcome the disadvantages of the prior art.

Another object of the invention is to provide a torque and impulse transmitting machine wherein the parts are protected from excessive stresses and which can be readily converted from operation with transmission of impulses to operation with simultaneous transmission of torque and impulses, or vice versa.

A further object of the invention is to provide a torque and impulse transmitting machine which is of light weight and small size. An additional object of the present invention is to provide a torque and impulse transmitting machine having a gear train which is reliable in operation, simple in construction, and easy to maintain.

Still another object of the invention is to provide a torque and impulse transmitting machine having a gear transmission which occupies a minimal amount of space.

In keeping with these objects and others which will become apparent hereinafter, one feature of the invention resides in a torque and impulse transmitting machine which comprises an elongated housing having a median plane of symmetry which extends in direction of the elongation of the housing. A tool holder is mounted on the housing for holding a material-penetrating tool such as a drill bit or borer. A drive motor is also mounted in the housing and has a rotary output shaft mounted therein so as to lie in and substantially bisect the median plane. An impeller assembly is mounted in the housing and includes an impeller which is mounted for reciprocating movement therein so as to transmit impulses to the tool in the holder. A first motiontransmitting means or power train is arranged in series with the motor and the impeller assembly and is operative for reciprocating the impeller in response to rotation of the rotary shaft of the drive motor. One of the elements of the first motion-transmitting means is a crank gear which has an axis of rotation which is substantially parallel to the rotary shaft and which is offset from the median plane. In addition, a second motion-transmitting means or power train is arranged in the housing for transmitting torque to the tool in the holder. The second motion-transmitting means includes an intermediate gear which is laterally adjacent the crank gear and which is in motion-transmitting engagement with the latter.

The above-described arrangement of the gear transmission has the advantage that it occupies a relatively small amount of working space. Sufficient room is now provided for the intermediate gear which is employed in transmitting the torque of the rotary output shaft to the tool. Moreover, the small area occupied by the gear transmission assures that no crank gear, intermediate gear, or bevel gear mounted on the rotary output shaft need be mounted in the handle portion of the housing. Also, in accordance with the invention, the impeller assembly having a reciprocable impeller is symmetrically mounted in the housing so as to lie along the symmetry plane. Thus, the drive forces generated by the crank gear act closer to the middle of the impeller.

Moreover, another spaced-saving feature of the invention resides in the provision that the crank disc gear performs two separate functions. Firstly, the crank disc converts the rotary motion of the output shaft of the motor into an axial reciprocating movement for the impeller assembly by means of an eccentrically mounted pin. Secondly, the crank disc takes the same rotary motion of the output shaft of the drive motor and transmits the generated torque towards the tool by means of a set of gear teeth arranged circumferentially about the periphery of the crank disc and cooperating with similar teeth on the intermediate gear.

Still another feature in accordance with the invention is that all of the gears of the gear transmission are mounted in cantilever manner, that is, the axles of the respective gears extend downwardly from the underside of the lower face of the gear. This feature permits quick removal of a particular gear when the top cover of the housing has been removed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figures 1, 1A:
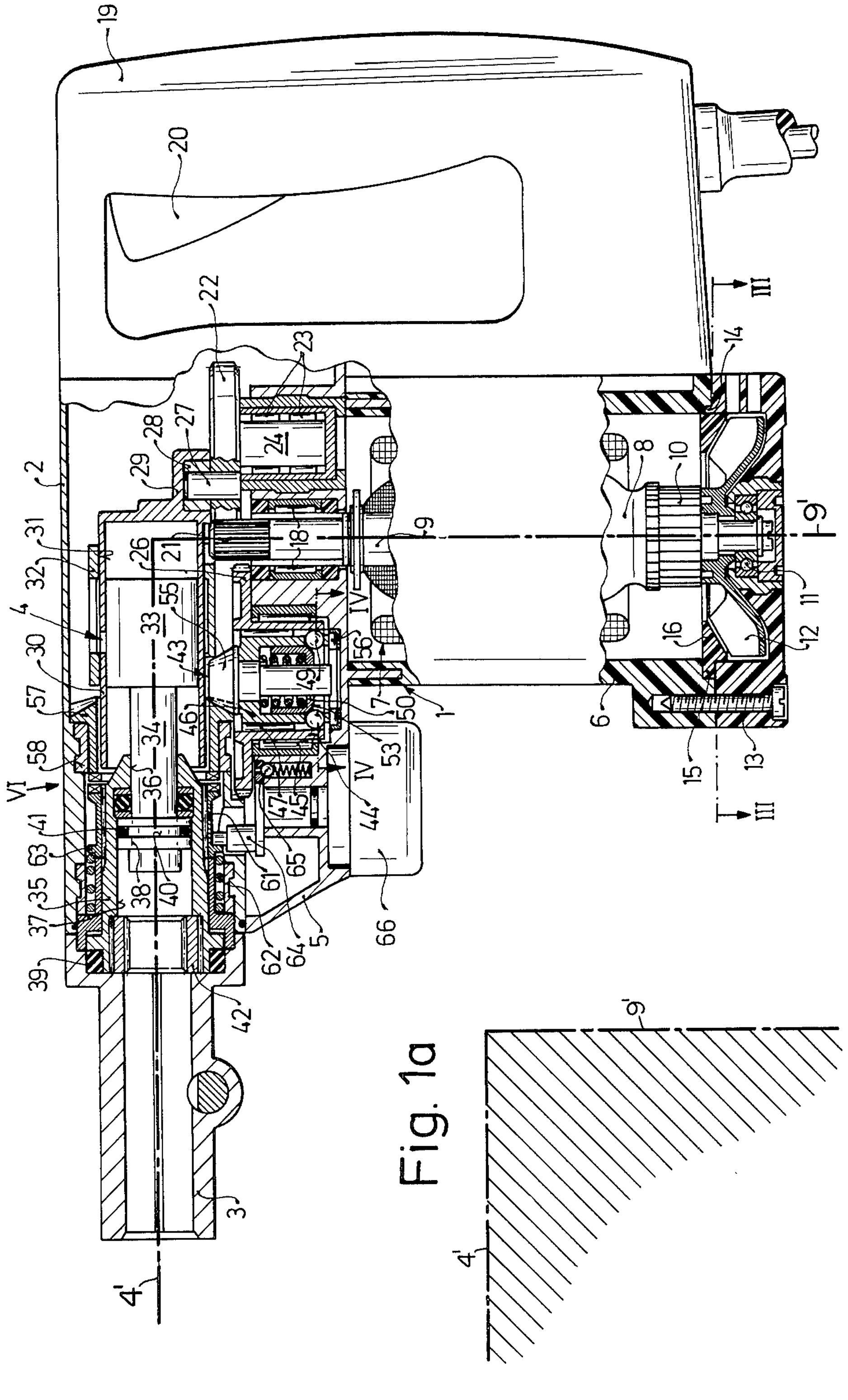
FIG. 1 is a longitudinal view, in partial vertical section, of a torque and impulse transmitting machine in accordance with the invention.

FIG. 1 illustrates a portable torque and impulse transmitting machine that is particularly adapted for drilling holes in concrete, rock and like materials. The machine comprises a composite housing including a first lower part 1 and a second upper part 2. Lower part 1 is comprised of a metallic transmission gear housing portion 5 and a plastic molded prime mover (motor) housing portion 6. Upper part 2 includes a tool holder 3 and a coaxially-mounted impeller assembly 4 which is reciprocable along axis 4'. At the rear end of the housing, i.e. the end opposite to the tool holder 3, a handle 19 and a trigger switch 20 are provided. The trigger switch is operative for completing an electrical circuit path to the motor drive or electromotor 7.

The rotor 8 of motor 7 has a rotary output shaft 9 which is journalled for rotation about axis 9 on opposite ends by anti-friction bearings. At the collector end 10 of the shaft 9, stationary ball-bearings 11 are arranged together with air blower 12. Synthetic plastic material cover 13 is mounted on motor housing portion 6 by screws (only one of which is shown) so as to overlie and protect the ball-bearings 11 and air blower 12. The cover 13 has a fitting 14 which permits alignment and adjustment of the cover relative to the motor housing 6.

Figure 3:
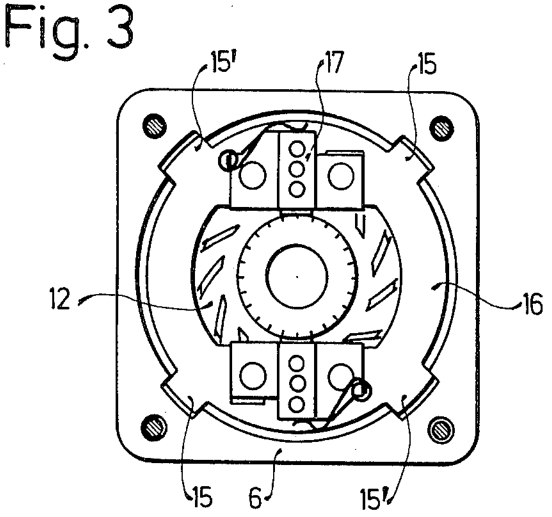
FIG. 3 is a view of a section taken on line III—III of FIG. 1.

As can be seen more clearly in FIG. 3, a commutator brush plate carrier 16, which is clamped between the cover 13 and the motor housing portion 6, comprises four symmetrically distributed locating lugs or projections 15 and 15' which are circumferentially arranged about fitting 14 so that each projection is received in a cooperating recess of the motor housing portion 6. Projections 15' lie diametrically opposite each other and are relatively wider than projections 15 in order to facilitate the mounting arrangement.

On the side of the ring or commutator carrier 16 which faces the collector 10, two box-shaped commutator brush holders 17 are arranged on opposite locations on the ring 16 so as to conduct electricity towards the motor 7. The ring 16 is preferably perforated in its central portion and cooperates with the illustrated air passages in the cover 13 so as to provide ventilation between the interior of the housing and the ambient atmosphere.

Figure 2:
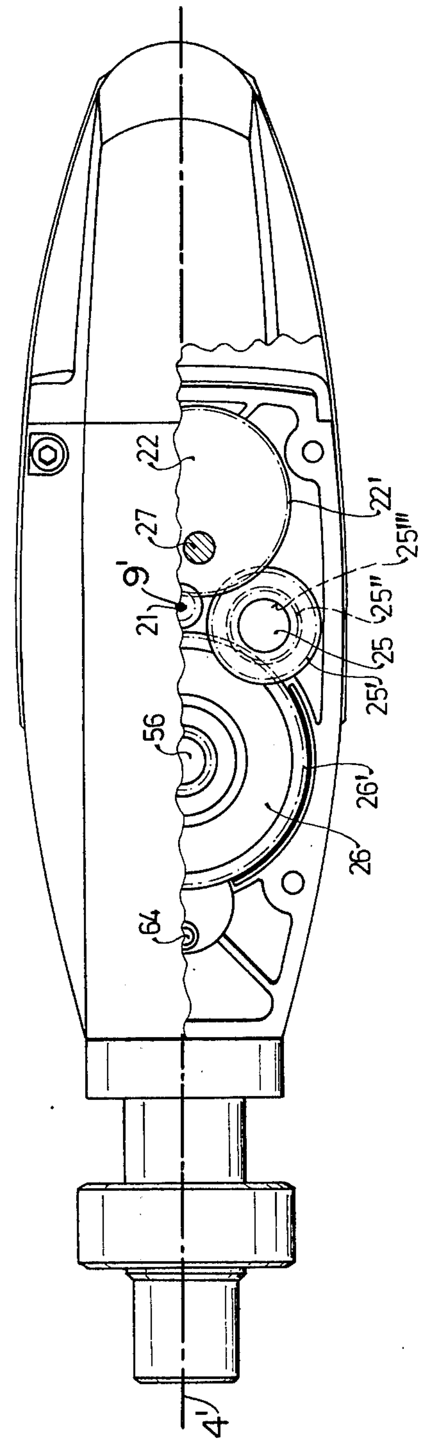
FIG. 2 is a partial top-plan view of the embodiment of FIG. 1 with the top cover of the housing removed.

The other end region of the shaft 9 extends into transmission housing portion 5 and is rotatably mounted in needle bearing 18. At the free end which projects outwardly of needle bearing 18, a drive pinion 21 is mounted. As can be seen more clearly in FIG. 2, the housing is elongated and has a median plane of symmetry extending in direction of the elongation of the housing, i.e. from right to left in FIG. 2. Both axis of rotation 9' and axis of reciprocation 4' lie in and define this common plane. Pinion 21 is mounted in the housing so as to have lateral portions which lie on substantially equally opposite sides of the symmetry plane, that is, the shaft 9 and its coaxial pin 21 are centrally arranged to be substantially bisected by the symmetry plane.

Pinion 21 meshes with the circumferential gear teeth 22' of a crank gear disc 22 which is rotatable in roller bearings 23 about crank axle 24. The axis of rotation of crank gear 22 is substantially parallel to the elongation of shaft 9 and, in addition, the axis of rotation of crank gear 22 is laterally offset relative to the median plane.

The upper face of crank gear 22 has an eccentric crank pin 27 which is surrounded by a slide stone or roller bearing 28 and which extends vertically into a guide slot of a reciprocable carriage 29. Carriage 29 is integral with cylinder 30 of the impeller assembly 4. The cylinder 30 is to-and-fro reciprocable along axis 41 in bore 31 of drive block 32. Bore 31 extends in direction of the elongation of the housing.

A piston 33 is reciprocable in and divides the interior of the cylinder 30 into rear and front air chambers. The piston rod 34 of piston 33 constitutes an impeller or ram and extends forwardly outwardly through the open end of the cylinder 30 and into a hollow, sleeve-like guide member 35. The cylinder 30 has openings for permitting communication between the air chambers with the ambient atmosphere in certain axial positions of the piston 33. When the piston is moved to its foremost position, the air openings connect the rear chamber with the atmosphere. The parts 22–24 and 27–35 constitute a first motion-transmitting means or power train which is operative for reciprocating the impeller 33 in response to rotation of the drive shaft 9 when the electric circuit of the motor 7 is completed by trigger 20.

The interior wall of the bore 31 is provided with a wear resistant coating. If the block 32 is constituted of aluminum alloy, then the interior walls of the bore 31 can be electrically coated with a hard aluminum oxide layer. If the block 32 is constituted of bronze, then the interior walls of the bore 31 can be coated with a teflon layer. If the block 32 is constituted of steel, the interior walls of the bore 31 can be provided with a hard metal layer or be treated with boron, phosphorus, or chronium.

The sleeve-like guide member 35 comprises a small bore 36 at its rear end and an enlarged bore 37 adjacent the rear end. The impact or forward end of impeller 34 is mounted for rotation in enlarged bore 37 and has an annular collar 38 which is received in enlarged bore 37 for sliding movement therewith. At the forward end of the guide member 35, a sealing ring 39 is clamped intermediate the guide member 35 and the tool holder 3. An annular sealing groove 40 adjacent the collar 38 receives an O-ring seal 41. Thus, a reliable seal is assured when the guide member 35 is rotated or when the impeller 34 is reciprocated to-and-fro relative to bore 37. Any lubricant provided in the interior of the machine can thus be prevented from escaping.

At the forward open end of the guide member 35, an interchangeable holder sleeve 42 is coaxially mounted with respect to the guide member 35. The holder sleeve 42 has an outer splined axial ribbed section which cooperates with the guide member 35 so as to obtain a tight rotary connection. The interior of the holder sleeve 42 has a configuration effective for transmitting torque to a non-illustrated material-penetrating tool, such as a bit, drill or analogous cutting element. By utilizing this configuration of parts, the impeller 34 and the holder sleeve 42 — both of which are constituted of highly wear-resistant materials — are easy to interchange and economical to manufacture.

Referring again to FIG. 2, the gear teeth 22' of crank gear 22 also meshes with the upper set of larger teeth 25' of intermediate gear 25 which is laterally adjacent the crank gear 22. A lower set of smaller teeth 25'' is in meshing engagement with the gear teeth 26' of coupling gear 26. The coupling gear 26 constitutes part of the safety or overload clutch which is operative for terminating the transmission of torque from the drive shaft 9 to the tool in the holder 3 when the resistance which the tool offers to rotation exceeds a predetermined value.

Figure 4:
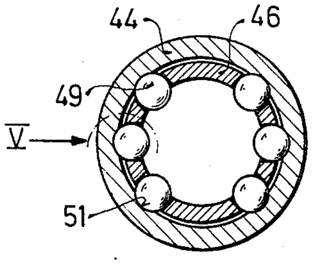
FIG. 4 is a view in partial section taken along the line IV—IV of FIG. 1.
Figure 5:
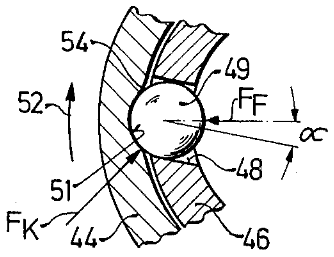
FIG. 5 is an enlarged view of a detail of FIG. 4.

Turning back to FIG. 1, the coupling gear 26 has an axially-extending central tubular portion or first clutch element 44 which is mounted for rotation in needle bearing 45. Coaxially located in the interior of the first clutch element 44, a second clutch element or an axially-extending tubular sleeve portion 46 is mounted for rotation by means of needle bearing 47. A coupling or ball members 49 is located intermediate clutch elements 44 and 46 for disengaging the latter with one another to thereby terminate the transmission of torque when the resistance exceeds the predetermined value. With reference to FIGS. 4 and 5, the balls 49 are mounted in bores 48 which are arranged circumferentially about clutch element 46. Each of the balls 49 are normally urged generally outwardly towards the recesses 51 formed on the clutch element 44 by a biasing arrangement which is located within the clutch element 46. The biasing arrangement includes a generally U-shaped member 50 having a base portion 53 in engagement with the balls 49, and has side walls mounted for sliding movement with the clutch element 46 by the action of the illustrated biasing spring.

As best seen in FIG. 5, the bores 48 do not extend precisely in radial direction. Instead, the side walls of each bore 48 form an acute angle $\alpha$ with respect to the radial line which extends through the center of each bore. Depending upon the size of the force to be absorbed, the angle $\alpha$ is generally selected to be in the range of between 2° and 20°, and preferably 5°. The force $F_f$ generated by the biasing arrangement is chosen to be smaller than the force $F_k$ which is generated by the turning or ratcheting of the clutch element 44 in circumferential direction 52. Thus, minimal wear is present at the surface at which the base portion 53 of the member 50 contacts the balls 49.

The base portion 53 has an outer radius which corresponds to the radius of the respective balls 49. This feature serves to further reduce wear and tear. When the balls 49 are moved out of the recesses 51, the bearing force between the base portion 53 of the member 50 and the balls 49 is changed. Depending upon the radius and the spring characteristic, the portion of the force acting on the balls 49 becomes greater. During slipping or ratcheting of the clutch elements 44, 46, a curvilinear taper at edge 54 of recess 51 reliably prevents excess wear.

As shown in FIG. 4, the bores 48 and the respectively associated recesses 51 are not spaced at equal intervals relative to one another about the circumference of clutch elements 44, 46. The clutch elements are coupled with one another in only two diametrically opposite positions. The overload clutch thus permits slipping only two times per revolution, a feature which also reduces wear.

Bevel gear 55 is coaxially mounted with clutch element 46 so as to turn with the latter. In operation, the axial forces generated by the overload clutch are transmitted by the axial needle bearing 56 to the housing portion 5. Bevel gear 55 meshes with a cooperating bevel gear formed at one end of a rotary member 57 which coaxially surrounds impeller assembly 4. The rotary member 57 has a hollow sleeve portion which is mounted for movement in slide bearing 58.

Figure 6:
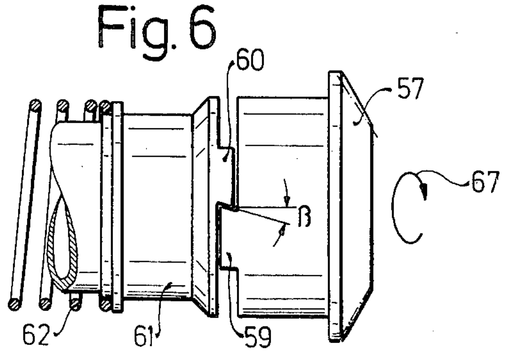
FIG. 6 is a side view of a detail identified by VI in FIG. 1.

As more clearly shown in FIG. 6, the forward end of the rotary member 57 is formed with claws 59 which can mesh with claws 60 of a rotary sleeve 61. Sleeve 61 surrounds guide member 35 and is mounted to turn with the same by the illustrated splined rib connection. One end of spring 62 abuts against shoulder 63 of the sleeve 61; the other end of the spring 62 abuts against the left flanged end of the sleeve 61. The spring is operative for urging the shoulder 63 against the eccentric pin 64 which constitutes a part of a selector switch that determines whether torque will or will not be transmitted to the tool in the holder 3.

The pin 64 is actuatable by switching knob 66 which extends outside of the housing between respective positions in which torque is, or is not, transmitted to the tool in holder 3.

In FIG. 1, the pin 64 is illustrated in a blocking position and is mounted thereat by the locking arrangement 65. In this position, the claws 59 and 60 are kept out of interengagement. By turning the knob 66, the pin 64 is moved away from its illustrated position. Now, the spring 62 is free to urge the shoulder 63 axially towards the right and cause claws 59 and 60 to mutually interengage, thus completing a mechanical connection for the transmission of torque.

In order to prevent unintended separation of the claws 59 and 60 during strong impulse transmission, the engaging surfaces of the claws 59 and 60 which respectively face each other form an angle $\beta$ with the axis of the impeller assembly 4. As shown in FIG. 6, the claws 59 and 60 are tapered in the circumferential direction 67. The angle $\beta$ is an acute angle and can have any value up to 30°, and preferably 10°. The axial force of the spring 62 acting on the sleeve 61 can thus be held relatively small. This results in a further reduction of wear and in the magnitude of the force required for switching the pin 64.

Briefly, the operation of the torque and impulse transmitting machine is as follows: The trigger 20 can be depressed to complete the circuit of the motor 7 whereby the pinion 21 on the drive shaft 9 drives the crank disc 22. The eccentric crank pin 27 causes cylinder 30 to move back and forth whereby the cylinder 30 reciprocates the piston 33. The piston 33 has some freedom of axial movement with respect to cylinder 30 due to the provision of the air cushions in the front and rear chambers. The free end of piston 33 transmits axially-oriented pulses to a tool (not shown) in tool holder 3.

In the illustrated switching position of pin 64, the motor only transmits axial impulse forces since the claws 59 and 60 are not in engagement. This circular motion of crank disc 22 is converted to axial, harmonic-type motion. The cylinder 30 is moved through the greatest distance at the maximum forward speed of the disc 22. The maximum required driving force acting at the center of the piston 33 becomes smaller because of the previously described offset of the axis of rotation of the crank disc 22 relative to the median plane of the housing. Thus, the reaction force generated in the bore 31 is correspondingly lower, thereby reducing friction losses and wear of the moving parts.

In the other switching position of pin 64, the claws 59 and 60 engage each other and permit torque to be transmitted to the tool. The torque is transmitted from the drive shaft 9 to the crank disc 22, to the intermediate gear 25, to the coupler gear 26, through the overload safety clutch 43, and thereupon to the member 57 which is coupled with the sleeve 61. Depending upon the resistance encountered by the material to be penetrated, the coupling balls 49 will slip out of the recesses 51 and act against the force of the biasing arrangement 50.

The arrangement of all the gears of the transmission offers a minimum utilization of working space without sacrificing reliability and efficiency. Maintenance and repairs are also simplified. In accordance with the invention, the mounting of all of the gears at the upper portion of the housing so that they can each by easily lifted out of the housing when housing portion 2 is removed is especially advantageous since no additional tools are needed. Moreover, the slide block 31 which frequency requires maintenance is also mounted to the upper portion of the housing so as to allow easy accessibility.

It will be understood that each of the elements described above, or two or more together, may also find a useful application in other types of constructions differing from the types described above.

While the invention has been illustrated and described as embodied in a torque and impulse transmitting machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A torque and impulse transmitting machine, comprising a housing; a tool holder mounted on the housing for holding a material-penetrating tool; a drive motor in the housing and having a rotary shaft mounted therein for rotation about an axis of rotation; an impeller assembly for transmitting impulses to the tool in said holder, said assembly having an impeller mounted for reciprocating movement along an axis of reciprocation, said axis of reciprocation and said axis of rotation both lying in and defining a common plane; first motion-transmitting means in motion-transmitting engagement with said motor and said impeller assembly and operative for reciprocating said impeller in response to rotation of said shaft, said first means comprising a crank gear mounted for rotation about an axis which extends in direction substantially parallel to said axis of rotation of said rotary shaft and which is offset from said common plane; and second motion-transmitting means arranged in the housing and operative for transmitting torque to the tool in said holder, said second means comprising an intermediate gear laterally adjacent said crank gear and being in motion-transmitting engagement with the latter.

2. A machine as defined in claim 1, wherein said first means further comprises a drive pinion mounted on said rotary shaft which extends in direction substantially normally to the direction of reciprocatory movement of said impeller.

3. A machine as defined in claim 1, wherein said crank gear has an annular gear portion, and wherein said first means includes a crank pin eccentrically mounted on said annular groove portion for reciprocably moving said impeller.

4. A machine as defined in claim 1, wherein said crank gear has an annular gear portion, and wherein said second means further includes a plurality of gear teeth circumferentially spaced about said annular gear portion of said crank gear for transmitting torque to the tool in said holder.

5. A machine as defined in claim 1, wherein said second means further comprises a coupling gear having an annular gear portion in meshing engagement with said intermediate gear, all of said gears having a cantilevered shaft portion.

6. A machine as defined in claim 5, wherein all of said cantilevered shaft portions are mounted in said housing so as to extend in direction substantially normally of the direction of reciprocatory movement of said impeller; and further comprising anti-friction bearings journalling said cantilevered shaft portions.

7. A machine as defined in claim 1, wherein said housing comprises a first lower part consisting of a first housing portion for said motor and a second housing portion for said gears, and a second upper part consisting of a third housing portion for said impeller assembly.

8. A machine as defined in claim 3, wherein said impeller assembly comprises guide means fixedly mounted in said housing, a hollow cylinder reciprocably mounted for sliding movement relative to said guide means and being coaxial with said impeller, and a piston reciprocably received in one axial end of said cylinder and rigid with said impeller; and further comprising a crank bearing surrounding said crank pin and both being received in a guide slot formed at the other axial end of said cylinder.

9. A machine as defined in claim 8, wherein said guide means has an internal circumferential wall; and further comprising a wear-resistant layer coated on said internal circumferential wall.

10. A machine as defined in claim 1, wherein said impeller assembly comprises a hollow cylinder in which said impeller is received at one axial end of said cylinder; and further comprising a tubular guide member slidingly mounted on said impeller for relative rotary movement.

11. A machine as defined in claim 10, wherein said impeller has a rod portion and a head portion, and wherein said tubular guide member is formed with a longitudinally-extending passage having a first section in which said rod portion is slidingly received and a second section in which said head portion is slidingly received.

12. A machine as defined in claim 10, wherein said guide member is formed with an annular projection axially spaced from said tool holder; and further comprising a sealing ring intermediate said projection and said tool holder for sealing the housing when torque is being transmitted to the tool in said holder.

13. A machine as defined in claim 11, wherein said impeller is formed with an annular groove adjacent said head portion; and further comprising a sealing ring in said groove for sealing the guide member when said impeller is being reciprocated.

14. A machine as defined in claim 10, wherein said tool holder includes an interchangeable sleeve member having an internal portion adapted to engage a tool, and an external portion having a plurality of axially-aligned splined teeth which mesh with cooperating teeth formed at a leading axial end of said guide member so as to form a rotary mechanical connection for transmitting torque to the tool.

15. A machine as defined in claim 10, wherein said second means further comprises an axially-movable, torque-transmitting sleeve member mounted about said guide member for imparting rotary movement thereto, and a torque-transmitting rotary member surrounding said hollow cylinder in coaxial relationship with said torque-transmitting sleeve member, said torque-transmitting members having respective claw portions which face each other.

16. A machine as defined in claim 15, wherein said sleeve member is formed with a raised shoulder; and further comprising biasing means acting on said shoulder for urging said sleeve member in axial direction towards said rotary member so as to permit said respective claw portions to interengage.

17. A machine as defined in claim 16; and further comprising switching means alternately permitting torque to be transmitted towards the tool in said holder, said switching means including a switching pin eccentrically mounted on a carrier and movable between respective positions in which the switching pin is in and out of engagement with said raised shoulder.

18. A machine as defined in claim 17; and further comprising means outside said housing for actuating said switching means; and further comprising means for locking said switching pin in its respective positions.

19. A machine as defined in claim 15, wherein said claw portions have wedge-shaped engagement portions which are inclined relative to the axial direction of movement of said sleeve so as to define an acute angle.

20. A machine as defined in claim 19, wherein said acute angle has a value of at least 10° and at most 30°.

21. A machine as defined in claim 1; and further comprising an overload safety clutch having first and second clutch elements which are disengaged from each other to thereby terminate the transmission of torque from said rotary shaft of the motor towards the tool in said holder when the resistance which the tool offers to rotation exceeds a predetermined value, said clutch elements being rotatable about a common axis and having adjacent surfaces one of which is provided with registering bores and the other of which is provided with registering recesses, said clutch further comprising torque-transmitting ball-shaped elements each received in respective ones of said registering bores and each having a spherical portion which is receivable in a respective one of said registering recesses, and means for biasing said spherical portions into said registering recesses with a force which suffices to cause rotation of said elements as a unit until the resistance which the tool offers to rotation reaches said value whereupon said spherical portions return into said registering bores against the opposition of said biasing means so that one of said elements can rotate with respect to the other element.

22. A machine as defined in claim 21, wherein said registering bores are elongated in generally radial direction and have side walls which are inclined relative to the radial direction so as to define an acute angle.

23. A machine as defined in claim 22, wherein said acute angle has a value of at least 2° and at most 20°.

24. A machine as defined in claim 21, wherein said biasing means includes a cup-shaped element formed with a circular base portion having a radius which substantially corresponds to the radial distance measured from the common axis of rotation of said clutch elements to the respective centers of the ball-shaped elements.

25. A machine as defined in claim 21, wherein said registering recesses have tapered edges.

26. A machine as defined in claim 21, wherein said registering recesses and bores are distributed about said clutch elements so that the latter are mutually coupled in only two diametrically opposite positions.

27. A machine as defined in claim 1; and further comprising an air blower arrangement mounted in said housing at one end of said rotary shaft, and anti-friction bearing means journalling said rotary shaft at said one end thereof.

28. A machine as defined in claim 27; and further comprising a cover mounted on said housing so as to overlie said one end of said rotary shaft, and a commutator ring mounted intermediate said cover and said housing, said commutator ring having a mounting portion which adjustably aligns the commutator ring in position relative to said housing.

29. A machine as defined in claim 28, wherein said commutator ring has a plurality of mounting lugs spaced circumferentially about the circumference thereof.

30. A machine as defined in claim 29, wherein said commutator ring has four lugs, and wherein two of said lugs are relatively wider than the remaining two of said lugs.

31. A machine as defined in claim 28, wherein said commutator ring is perforated to permit air to pass therethrough.

32. In a torque and impulse transmitting machine, a combination comprising a tool holder for holding a material-penetrating tool; drive means including a rotary shaft mounted for rotation about a first axis; an impeller assembly for transmitting impulses to the tool held in said holder, including an impeller mounted for reciprocating movement along a second axis which lies in a common plane with said first axis, and means surrounding and in frictional engagement with said impeller for guiding the latter during said reciprocating movement along said second axis; means for reciprocating said impeller relative to said guiding means in response to rotation of said rotary shaft, including a rotary crank gear in motion-transmitting engagement with said rotary shaft and with said impeller, said crank gear being mounted for rotation about an axis which is spaced at a predetermined distance laterally of said plane to thereby generate a force which acts upon said impeller substantially only in direction lengthwise of said second axis, whereby frictional losses resulting from components of force acting in direction skew to said second axis and tending to increase frictional contact between said impeller and said guiding means are substantially reduced; and means in motion-transmitting engagement with said crank gear for transmitting torque to the tool held in said holder.

* * * * *